(12) United States Patent
Jeong et al.

(10) Patent No.: US 8,912,953 B2
(45) Date of Patent: Dec. 16, 2014

(54) GPS RECEIVER AND CALCULATION METHOD OF NAVIGATION SOLUTION THEREOF

(75) Inventors: Seong Kyun Jeong, Gyeonggi-do (KR); Sang Uk Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 367 days.

(21) Appl. No.: 13/438,362

(22) Filed: Apr. 3, 2012

(65) Prior Publication Data
US 2013/0050018 A1   Feb. 28, 2013

(30) Foreign Application Priority Data
Aug. 30, 2011   (KR) ................ 10-2011-0087458

(51) Int. Cl.
*G01S 19/45*   (2010.01)
*G01S 19/42*   (2010.01)
*G01S 19/28*   (2010.01)

(52) U.S. Cl.
CPC ....... *G01S 19/42* (2013.01); *G01S 19/28* (2013.01)
USPC ................................... 342/357.28

(58) Field of Classification Search
USPC .................. 342/357.28, 357.23, 357.61
See application file for complete search history.

(56) References Cited

U.S. PATENT DOCUMENTS

| 2007/0096978 | A1 | 5/2007 | Van Diggelen et al. |
| 2011/0235686 | A1* | 9/2011 | Kojima et al. ........... 375/141 |

FOREIGN PATENT DOCUMENTS

KR   1020050063628 A   6/2005

* cited by examiner

*Primary Examiner* — Harry Liu
(74) *Attorney, Agent, or Firm* — Ladas & Parry LLP

(57) ABSTRACT

Provided is a GPS receiver, including: a navigation signal receiving unit receiving navigation signals from satellites; a navigation signal processing unit acquiring position information of each satellite from the received navigation signal and measuring a pseudo-range; a pseudo-range estimating unit determining whether a satellite of which the pseudo-range may be estimated exists among the satellites from which the navigation signals are transmitted in the case where the number of satellites from which the navigation signals are transmitted is 3 or less and estimating the pseudo-range of the determined satellite; and a navigation solution calculating unit calculating a navigation solution by using the measured pseudo-range and the estimated pseudo-range.

18 Claims, 3 Drawing Sheets

GPS RECEIVER AND CALCULATION METHOD OF NAVIGATION SOLUTION THEREOF

CROSS-REFERENCE TO RELATED APPLICATIONS

This application claims priority to and the benefit of Korean Patent Application No. 10-2011-0087458 filed in the Korean Intellectual Property Office on Aug. 30, 2011, the entire contents of which are incorporated herein by reference.

TECHNICAL FIELD

The present invention relates to a global positioning system (GPS) detecting a position of a user through a navigation satellite and more particularly to a GPS receiver and a calculation method of a navigation solution thereof.

BACKGROUND ART

A global positioning system is a technique of receiving navigation signals transmitted from satellites to calculate a current position of a receiver. As is generally known, in order to calculate the position of the receiver, the navigation signals need to be received from at least four satellites and thus as the number of satellites from which the navigation signals are transmitted increases, an accurate position of the receiver may be generally calculated.

However, in the case where the navigation signals are blocked by obstacles such as a mountainous terrain, buildings in urban areas, trees, and the like, the number of satellites from which the navigation signals are transmitted decreases and thus navigation performance is deteriorated and when the number of satellites from which the navigation signals are transmitted decreases to 3 or less, the position of the receiver may not be calculated.

SUMMARY OF THE INVENTION

The present invention has been made in an effort to improve navigation performance of a GPS receiver in an area where navigation signals are temporarily blocked, such as a mountainous terrain, urban areas, and the like.

An exemplary embodiment of the present invention provides a GPS receiver, including: a navigation signal receiving unit receiving navigation signals from satellites; a navigation signal processing unit acquiring position information of each satellite from the received navigation signals and measuring a pseudo-range; a pseudo-range estimating unit determining whether a satellite of which a pseudo-range may be estimated exists among the satellites from which the navigation signals are transmitted in the case where the number of satellites from which the navigation signals are transmitted is 3 or less and estimating the pseudo-range of the determined satellite; and a navigation solution calculating unit calculating a navigation solution by using the measured pseudo-range and the estimated pseudo-range.

The pseudo-range estimating unit may estimate a position of the GPS receiver, calculate a position of the determined satellite from ephemeris of the determined satellite, and estimate the pseudo-range by using the position of the GPS receiver and the position of the determined satellite.

The pseudo-range estimating unit may estimate the position of the GPS receiver by using position information and velocity and acceleration information of the GPS receiver at a predetermined time of the past.

The GPS receiver may further include an abnormal satellite determining unit determining an abnormal satellite by using the navigation signal of each satellite among the satellites from which the navigation signals are transmitted, in which the pseudo-range estimating unit may determine whether the satellite of which the pseudo-range may be estimated exists, when the number of satellites except for the abnormal satellite among the satellites from which the navigation signals are transmitted is 3 or less.

The abnormal satellite determining unit may determine the abnormal satellite based on a signal to noise ratio of the navigation signal.

The abnormal satellite determining unit may determine the abnormal satellite based on a change according to time of a pseudo-range or a carrier phase which is a measured value acquired from the navigation signal.

The pseudo-range estimating unit may determine a satellite where the navigation signal is received within a predetermined past time from the current time, but the navigation signal is not received at the current time as the satellite of which the pseudo-range may be estimated.

The pseudo-range estimating unit may determine a satellite where the signal to noise ratio is a predetermined threshold or more within a predetermined past time from the current time, but the signal to noise ratio decreases to the threshold or less at the current time as the satellite of which the pseudo-range may be estimated.

The pseudo-range estimating unit may correct the estimated pseudo-range by using the pseudo-range estimated from a previously measured pseudo-range of the determined satellite.

The pseudo-range estimated from the previously measured pseudo-range of the determined satellite may be estimated by using any one of a modeling technique using a polynomial function, a modeling technique using a neural network, and a Kalman filter.

Another exemplary embodiment of the present invention provides a calculation method of a navigation solution, including: receiving navigation signals from satellites; acquiring position information of each satellite from the received navigation signal and measuring a pseudo-range; determining whether a satellite of which the pseudo-range may be estimated exists among the satellites from which the navigation signals are transmitted in the case where the number of satellites from which the navigation signals are transmitted is 3 or less; estimating the pseudo-range of the determined satellite when the satellite of which the pseudo-range may be estimated exists; and calculating a navigation solution by using the measured pseudo-range and the estimated pseudo-range.

In the estimating of the pseudo-range, a position of the GPS receiver may be estimated, a position of the determined satellite from ephemeris of the determined satellite may be calculated, and the pseudo-range may be estimated by using the position of the GPS receiver and the position of the determined satellite.

In the estimating of the pseudo-range, the position of the GPS receiver may be estimated by using position information and velocity and acceleration information of the GPS receiver at a predetermined time of the past.

The calculation method of a navigation solution may further include determining an abnormal satellite by using the navigation signal of each satellite among the satellites from which the navigation signals are transmitted, in which in the estimating of the pseudo-range, whether the satellite of which the pseudo-range may be estimated exists may be determined, when the number of satellites except for the abnormal satellite among the satellites from which the navigation signals are transmitted is 3 or less.

In the determining of the abnormal satellite, the abnormal satellite may be determined based on a signal to noise ratio of the navigation signal.

In the determining of the abnormal satellite, the abnormal satellite may be determined based on a change according to time of a pseudo-range or a carrier phase which is a measured value acquired from the navigation signal.

In the determining of whether the satellite of which the pseudo-range may be estimated exists, a satellite where the navigation signal is received within a predetermined past time from the current time, but the navigation signal is not received at the current time may be determined as the satellite of which the pseudo-range may be estimated.

In the determining of whether the satellite of which the pseudo-range may be estimated exists, a satellite where the signal to noise ratio is a predetermined threshold or more within a predetermined past time from the current time, but the signal to noise ratio decreases to the threshold or less at the current time may be determined as the satellite of which the pseudo-range may be estimated.

According to the exemplary embodiments of the present invention, in the case where navigation signals are temporarily blocked due to obstacles in urban areas or a mountainous terrain, a pseudo-range of a satellite is estimated, such that it is possible to prevent an error of a GPS receiver and maintain navigation performance.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
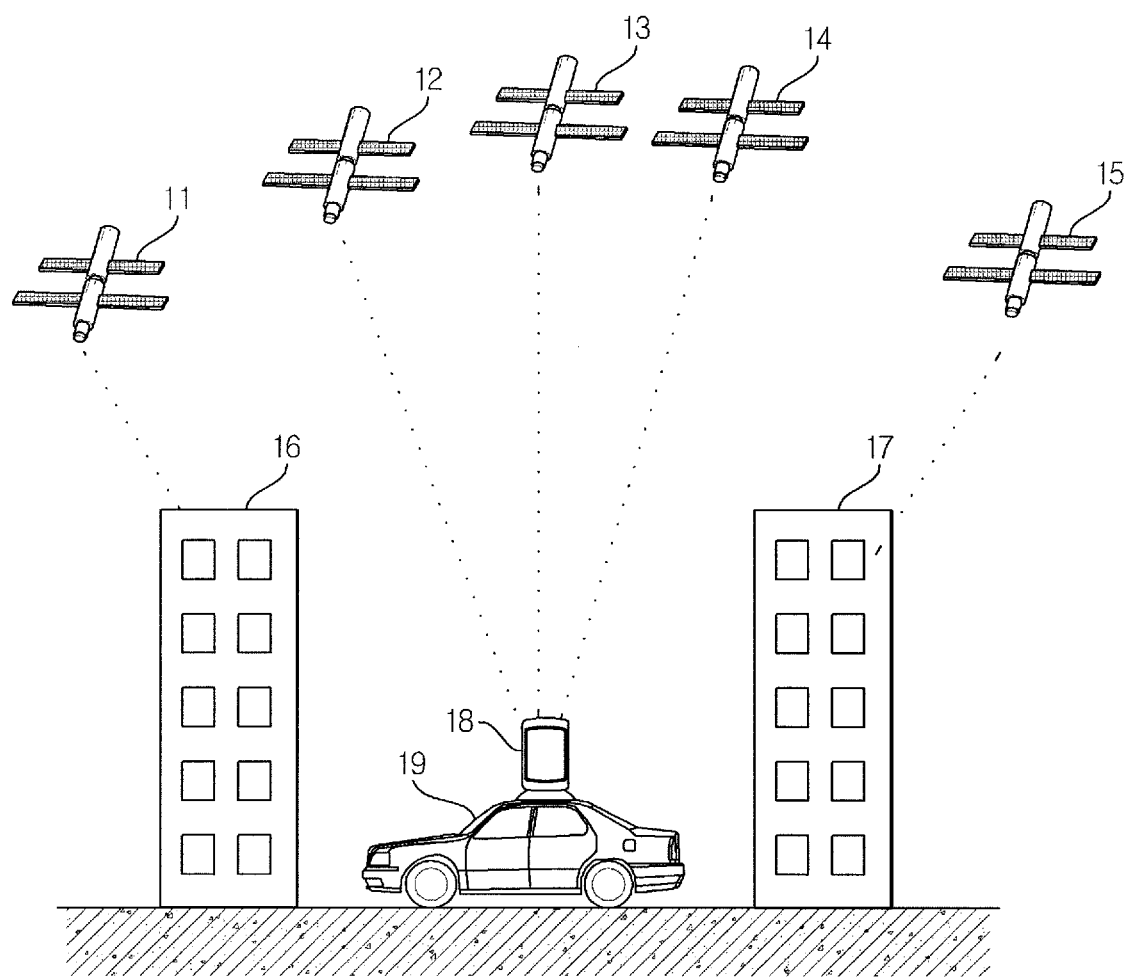
FIG. 1 is a diagram illustrating an example where a navigation signal is blocked by obstacles and thus navigation performance is deteriorated in a general global navigation system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a diagram illustrating an example where a navigation signal is blocked by obstacles and thus navigation performance is deteriorated in a general global navigation system. As shown in FIG. 1, a GPS receiver 18 is provided in a moving object such as a vehicle 19 or a person and while the vehicle 19 moves, a navigation signal may be temporarily blocked by obstacles such as buildings 16 and 17 and the like. The GPS receiver 18 needs to normally receive navigation signals from four or more satellites, for example, satellites 11, 12, 13, 14, and 15, in order to calculate a position. However, as shown in FIG. 1, when navigation signals are not received from some satellites 11 and 15 due to the buildings 16 and 17, visible satellites from which the navigation signals are transmitted are only three satellites 12, 13, and 14 and thus the position of the GPS receiver 18 may not be calculated.

As described above, in the present invention, when the navigation signals from some of the satellites are temporarily blocked and thus the number of visible satellites from which the navigation signals are transmitted decreases to three or less or quality in the navigation signals of some satellites is not good and thus the number of available satellites which may be used for calculating a navigation solution decreases to three or less, a pseudo-range which is a measured value of the navigation signal is estimated, such that the navigation performance of the GPS receiver may be maintained.

Figure 2:
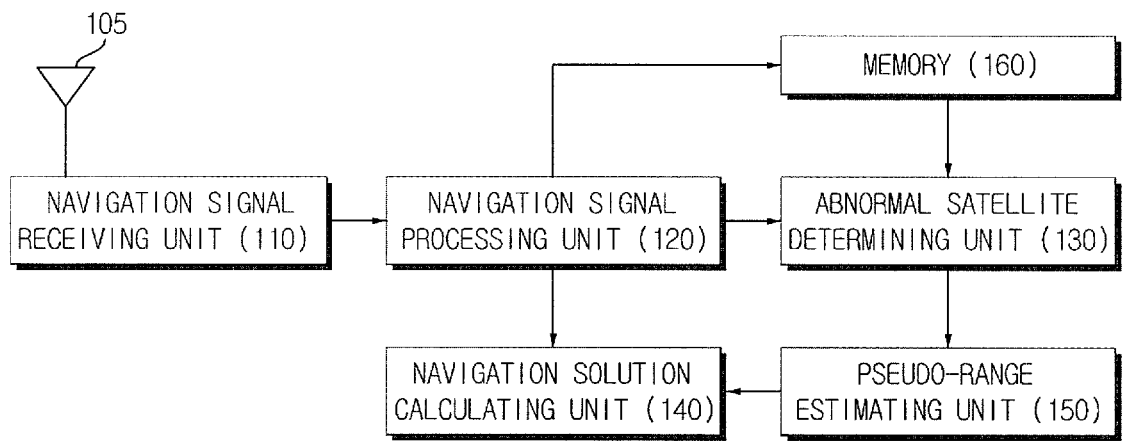
FIG. 2 is a diagram illustrating the configuration of a GPS receiver according to an exemplary embodiment of the present invention.

FIG. 2 is a diagram illustrating the configuration of a GPS receiver according to an exemplary embodiment of the present invention. The GPS receiver according to the exemplary embodiment includes a navigation signal receiving unit 110, a navigation signal processing unit 120, an abnormal satellite determining unit 130, a navigation solution calculating unit 140, a pseudo-range estimating unit 150, and a memory 160.

The navigation signal receiving unit 110 receives navigation signals from a plurality of satellites through an antenna 105. In this case, a satellite where the navigation signal is received is referred to as a visible satellite. A PRN code, carrier information, and a navigation message are included in the navigation signal.

The navigation signal processing unit 120 acquires a navigation message from the received navigation signal and calculates measured values, such as a pseudo-range, a carrier phase, and the like. The navigation message includes information on a state of the corresponding satellite, ephemeris, almanac information, and information on an ionospheric model. The pseudo-range, as an approximate distance between the satellite and the GPS receiver, is calculated by measuring a time taken when the PRN code transmitted from the corresponding satellite reaches the GPS receiver. Further, the navigation signal processing unit 120 acquires position information of the corresponding satellite by using the ephemeris of the satellite.

The navigation solution calculating unit 140 calculates the navigation solution by using the position information of each satellite acquired from the navigation signals of the satellites and the pseudo-range, thereby acquiring the position information of the GPS satellite. As described above, the navigation solution may be calculated only when the position information and the pseudo-range of at least four satellites are given.

The abnormal satellite determining unit 130 determines an abnormal satellite having bad quality in the navigation signal among the visible satellites by using the navigation signals processed by the navigation signal processing unit 120. This is because an error may occur in the case where the navigation solution is calculated by the measured value acquired from the navigation signal having the bad quality and the position information of the satellite. When the abnormal satellite is determined, the abnormal satellite determining unit 130 provides the information to the navigation signal processing unit 120 or the navigation solution calculating unit 140. Then, the navigation signal processing unit 120 does not process the navigation signal of the corresponding satellite or the navigation solution calculating unit 140 excludes the position information and the pseudo-range of the corresponding satellite from the process of calculating the navigation solution. As described above, the satellites except for the abnormal satellite among the visible satellites are referred to as available satellites.

A detailed method for determining the abnormal satellite by the abnormal satellite determining unit 130 is as follows.

As an exemplary embodiment, the abnormal satellite determining unit 130 may determine the abnormal satellite by measuring a signal to noise ratio (SNR) of the navigation signal. For example, when the signal to noise ratio (SNR) of the navigation signal is a predetermined threshold or less, the corresponding satellite may be determined as the abnormal satellite.

As another exemplary embodiment, the abnormal satellite determining unit 130 may determine the abnormal satellite by using a change according to time of the measured value acquired from the navigation signal. For example, when the pseudo-range or the carrier phase is abruptly changed, the corresponding satellite may be determined as the abnormal satellite. In this case, the abnormal satellite determining unit 130 may calculate a change rate according to time of the pseudo-range or the carrier phase acquired from the navigation signal processing unit 120 and determine the corresponding satellite as the abnormal satellite in the case where the change rate is a predetermined threshold or more. As yet another exemplary embodiment, the abnormal satellite may be determined by comparing changing characteristics according to time of the pseudo-range and the barrier phase. In other words, if the pseudo-range is almost not changed, but only the barrier phase is abruptly changed, the corresponding satellite is determined as the abnormal satellite. In this case, the abnormal satellite determining unit 130 may calculate change rates according to time of the pseudo-range and the carrier phase, respectively and in the case where a ratio of the change rate of the pseudo-range and the change rate of the barrier phase is a predetermined threshold or more, the corresponding satellite may be determined as the abnormal satellite.

In the case where the number of available satellites according to the determined result of the abnormal satellite is still four or more, the navigation solution calculating unit 140 may calculate the navigation solution. However, if the number of available satellites is three or less, the navigation solution calculating unit 140 may not calculate the navigation solution. As described above, in the case where the number of satellites except for the abnormal satellites among the visible satellites is three or less, first, the pseudo-range estimating unit 150 determines whether a satellite of which the pseudo-range may be estimated exists among the satellites from which the navigation signals are transmitted other than current available satellites.

The satellite of which the pseudo-range may be estimated corresponds to a satellite which is utilized as the available satellite by receiving the navigation signal in the related art and then excluded from the available satellites by blocking the navigation signal due to the obstacles, or a satellite which is utilized as the available satellite as signal quality is good in the related art and then excluded from the available satellite as the signal quality is abruptly deteriorated.

In order to determine the satellite of which the pseudo-range may be estimated, the pseudo-range estimating unit 150 checks whether there is a satellite in which the navigation signal is received from the navigation signal receiving unit 110 within a predetermined past time from the current time and then the navigation signal is not received at the current time. For example, the pseudo-range estimating unit 150 checks whether there is a satellite in which the navigation signal had been received and processed in the navigation signal processing unit 120 at the time of one second before the current time, but the navigation signal is not received at the current time.

In order to determine the satellite of which the pseudo-range may be estimated, the pseudo-range estimating unit 150 checks whether there is a satellite excluded from the available satellites, in which the navigation signal is received by the navigation signal receiving unit 110 within a predetermined past time from the current time and the signal to noise ratio (SNR) is a predetermined threshold or more in the abnormal satellite determining unit 130, but the signal to noise ratio (SNR) decreases at the current time. For example, the pseudo-range estimating unit 150 checks whether there is a satellite in which the navigation signal had been received and processed in the navigation signal processing unit 120 because the signal to noise ratio (SNR) is a predetermined threshold or more at the time of one second before the current time, but the signal to noise ratio (SNR) is lower than the threshold at the current time.

However, the pseudo-range estimating unit 150 measures an elevation angle of the satellite to exclude a satellite which disappears below the earth's surface from the satellites of which the pseudo-range may be estimated. The reason is because the chance that the satellite will be again restored to a normal satellite is very low.

As shown in FIG. 2, the GPS receiver includes the memory 160 and information such as a signal to noise ratio for the received navigation signal and the like, a navigation message acquired from the navigation signal, and a measured value are stored in the memory 160 in chronological order. Information for a newly received navigation signal, a navigation message acquired from the corresponding navigation signal, and a measured value are continuously updated and the oldest information is periodically deleted from the memory 160. The information stored therein is used for determining a satellite of which the pseudo-range may be estimated and estimating the pseudo-range by the pseudo-range estimating unit 150.

If the satellite of which the pseudo-range may be estimated is determined, the pseudo-range estimating unit 150 estimates the pseudo-range of the determined satellite.

In an exemplary embodiment, the pseudo-range estimating unit 150 estimates a current position from past movement information of the GPS receiver and estimates the pseudo-range of the satellite by using the estimated position. For this end, position information and velocity and acceleration information of the GPS receiver acquired through the calculation of the navigation solution are stored in the memory in chronological order and the oldest information is periodically deleted.

The pseudo-range estimating unit 150 reads the latest position information and velocity and acceleration information of the GPS receiver with reference to the memory 160. The information may correspond to the latest position information and velocity and acceleration information of the GPS receiver at the time when the navigation signal is received and then blocked or the signal to noise ratio of the navigation signal is the threshold or more and then decreases to the threshold or less. In addition, the pseudo-range estimating unit 150 estimates a current position of the GPS receiver by using the read position information and velocity and acceleration information of the GPS receiver. Further, the pseudo-range estimating unit 150 calculates the position information of the corresponding satellite at the current time from the ephemeris included in the navigation message of the corresponding satellite stored in the memory 160. The pseudo-range of the corresponding satellite is calculated by using the position information of the GPS receiver and the position information of the satellite which are acquired as described above. The estimated pseudo-range of the satellite is provided to the navigation solution calculating unit 140. As described above, by estimating the pseudo-range of the satellite by using the position information of the GPS receiver, the movement of the GPS receiver may be considered.

When the sum of the number of available satellites in which the navigation signal processing unit 120 processes the navigation signals and the number of satellites in which the pseudo-range estimating unit 150 estimates the pseudo-ranges is 4 or more, the navigation solution calculating unit 140 calculates the navigation solution by using the pseudo-ranges and the position information of the satellites, thereby acquiring the position information of the GPS satellite. Accordingly, although the number of available satellites does not reach 4, if the sum of the number of available satellites and the number of satellites of which the pseudo-ranges are estimated is 4 or more, the navigation solution may be calculated.

Additionally, the pseudo-range estimating unit 150 estimates the pseudo-range by using the previously measured pseudo-range of the satellite to estimate the pseudo-range and as described above, the estimated pseudo-range may be corrected with the position information of the GPS receiver and the ephemeris of the satellite by using the estimated result. The information of the previously measured pseudo-range of the corresponding satellite may be acquired from the memory 160. A method of estimating a current pseudo-range from the information of the previously measured pseudo-range may utilize various techniques known in the related art, such as a modeling technique using a polynomial function, a modeling technique using a neural network, a technique using a Kalman filter, and the like. As describe above, the pseudo-range estimated from the previously measured pseudo-range may not consider the movement of the GPS receiver, but, as described above, may serve to correct the estimated pseudo-range by using the position information of the GPS receiver. Hereinafter, for convenience, the pseudo-range estimated by using the position information of the GPS receiver and the ephemeris of the satellite is referred to as a first pseudo-range and the pseudo-range estimated by the previously measured pseudo-range is referred to as a second pseudo-range. For example, the pseudo-range estimating unit 150 may determine the pseudo-range of the satellite by taking an average or a weighted average of the first pseudo-range and the second pseudo-range.

Meanwhile, in the case where pseudo-ranges of the satellites other than the available satellites are estimated, the pseudo-range estimating unit 150 also estimates the pseudo-ranges of available satellites by the same method and compares the estimated result and the pseudo-ranges of actually measured values, thereby verifying the estimated pseudo-range. The verified result may be utilized for correcting the estimated pseudo-range by using the position information of the GPS receiver. For example, the pseudo-range estimating unit 150 also estimates the pseudo-range of the available satellite by using the estimated position information of the GPS receiver and the position information of the available satellite acquired from the ephemeris included in the navigation message of the available satellite. In addition, the pseudo-range estimating unit 150 compares the pseudo-range measured in the navigation signal processing unit 120 with the estimated pseudo-range. As the compared result, if a difference therebetween is not large, the first pseudo-range for the satellite other than the available satellites is not corrected, but used as it is, or when the weighted average of the first pseudo-range and the second pseudo-range is taken, a higher weighted value may be given to the first pseudo-range. However, as the compared result, if the difference is large, when the weighted average of the first pseudo-range and the second pseudo-range is taken, a lower weighted value may be given to the first pseudo-range.

Figure 3:
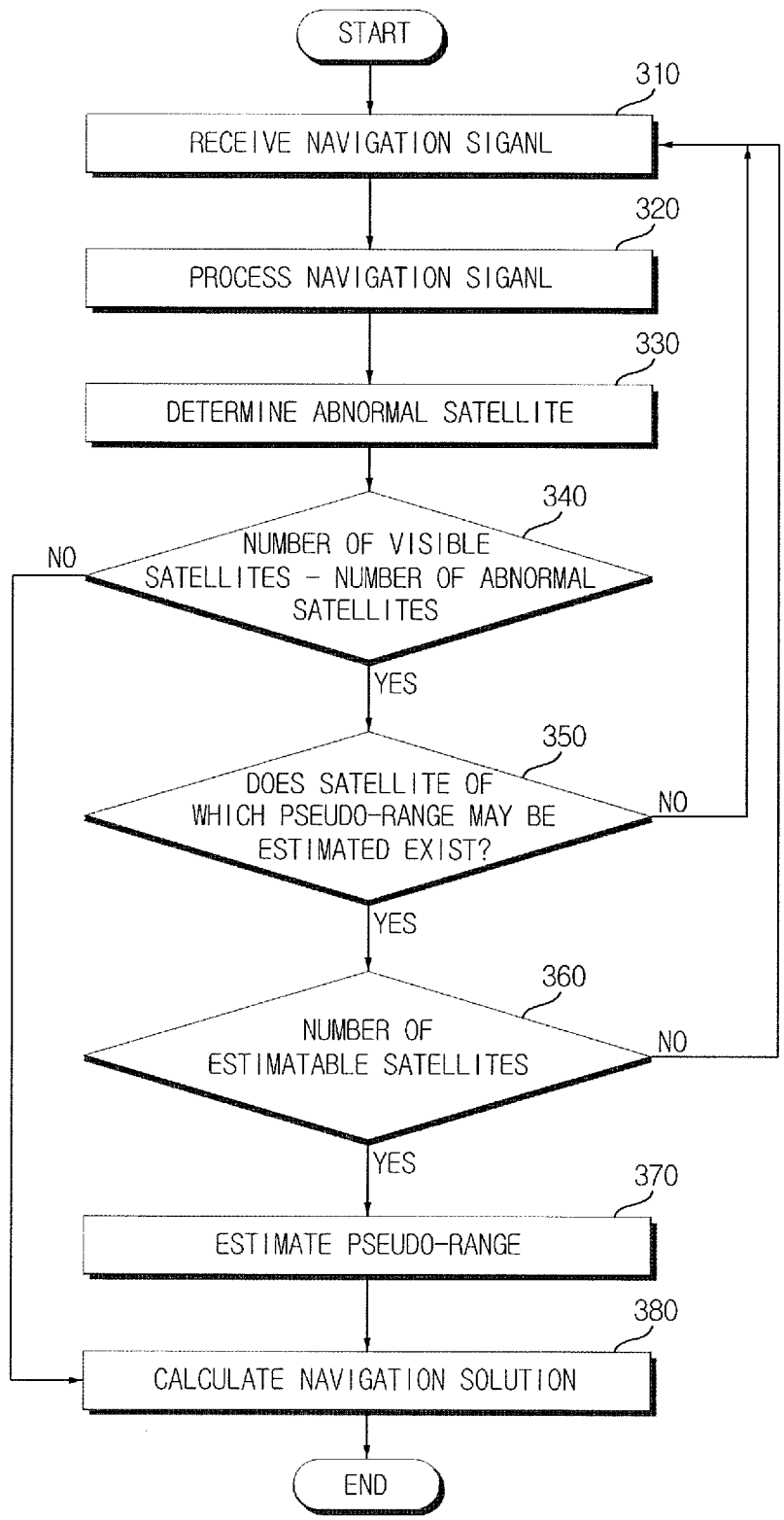
FIG. 3 is a flowchart illustrating a calculation method of a navigation solution according to an exemplary embodiment of the present invention.

FIG. 3 is a flowchart illustrating a calculation method of a navigation solution according to an exemplary embodiment of the present invention. The calculation method of a navigation solution according to the exemplary embodiment is configured by steps processed in the aforementioned GPS receiver. Accordingly, although not described below, the description for the GPS receiver described above is also applied to the calculation method of a navigation solution according to the exemplary embodiment.

At step 310, the navigation signal receiving unit 110 receives navigation signals from a plurality of satellites through an antenna 105.

At step 320, the navigation signal processing unit 120 acquires a navigation message by processing the navigation signals and calculates measured values, such as a pseudo-range, a carrier phase, and the like.

At step 330, the abnormal satellite determining unit 130 determines an abnormal satellite having bad quality in the navigation signal among the visible satellites by using the navigation signals processed at step 320. As described above, a method of determining the abnormal satellite may use a signal to noise ratio of the navigation signal. In addition, the method may use a change according to time of the measured value acquired from the navigation signal.

At step 340, the abnormal satellite determining unit 130 determines whether a value which subtracts the number of abnormal satellites from the number of visible satellites is 3 or less. If the value is not 3 or less, that is, the number of available satellites except for the abnormal satellites among the visible satellites is 4 or more, step 380 is performed and at step 380, the navigation solution calculating unit 140 calculates the navigation solution by using the position information and the pseudo-ranges acquired from the navigation signals of the available satellites.

At step 340, if a value N which subtracts the number of abnormal satellites from the number of visible satellites is three or less, step 350 is performed and at step 350, the pseudo-range estimating unit 150 determines whether a satellite of which the pseudo-range may be estimated exists among the satellites from which the navigation signals are transmitted other than the available satellites. As described above, satellites in which the navigation signal is received within a predetermined past time from the current time and then not received, or satellites in which the signal to noise ratio of the navigation signal received within a predetermined past time from the current time is a threshold or more and then decreases to the threshold or less are determined as the satellites capable of estimating the pseudo-ranges.

At step 360, the pseudo-range estimating unit 150 determines whether a value adding the number of satellites capable of estimating the pseudo-ranges to the value N which subtracts the number of abnormal satellites from the number of visible satellites is 4 or more. When the value is less than 4, that is, although the number of satellites capable of estimating the pseudo-ranges is added to the number of available satellites, when the added number does not reach 4, the navigation solution may not be calculated and thus returning to step 310 again, the process is repeated.

If the value adding the number of satellites capable of estimating the pseudo-ranges to the value N which subtracts the number of abnormal satellites from the number of visible satellites is 4 or more, step 370 is performed and at step 370, the pseudo-range estimating unit 150 estimates the pseudo-range of the corresponding satellite. As described above, at step 370, the current position of the GPS receiver is estimated from the previous movement information of the GPS receiver and the pseudo-range of the corresponding satellite is estimated by using the position information of the GPS receiver and the position information of the corresponding satellite calculated from the previously acquired ephemeris of the corresponding satellite. According to an exemplary embodiment, the pseudo-range estimating unit 150 may estimate the current pseudo-range by using the previously measured pseudo-range of the corresponding satellite and correct the pseudo-range estimated by using the estimated position information of the GPS receiver and the position information of the satellite by using the value.

After step 370, at step 380, the navigation solution calculating unit 140 calculates the navigation solution by using the pseudo-range of the available satellite acquired at step 320 and the pseudo-range of the satellite other than the available satellite estimated at step 370.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A GPS receiver, comprising:
   a navigation signal receiving unit receiving a plurality of navigation signals from a plurality of respective satellites, including a first navigation signal from a first satellite, and wherein a first communication path from the first satellite to the receiving unit is unobstructed;
   a navigation signal processing unit acquiring position information of each respective satellite from the received navigation signals and measuring respective pseudo-ranges from the respective satellites to the receiving unit, including a first pseudo-range of the first satellite; and
   a pseudo-range estimating unit determining an abnormal state of a second navigation signal from the first satellite to the receiving unit, wherein the second navigation signal is transmitted a time after the first navigation signal was transmitted and, upon determining the abnormal state, estimating a current location of the receiving unit and calculating a current position of the first satellite based upon first satellite position information previously stored in a memory before the abnormal state was determined, and estimating a second pseudo-range of the first satellite based upon the calculated current position of the first satellite and the estimated current location of the receiving unit,
   wherein the abnormal state of the second navigation signal is determined based on a change according to time of a pseudo-range or a cater phase which is a measured value acquired from a navigation signal.

2. The GPS receiver of claim 1, wherein the pseudo-range estimating unit calculates the current position of the first satellite from ephemeris data.

3. The GPS receiver of claim 2, wherein the pseudo-range estimating unit estimates the position of the receiving unit by using position information and velocity and acceleration information of the receiving unit.

4. The GPS receiver of claim 1, further comprising: an abnormal satellite determining unit determining an abnormal satellite by using the respective navigation signals of each satellite, and wherein a number of unobstructed satellites is 3 or less.

5. The GPS receiver of claim 4, wherein the abnormal state of the second navigation signal is determined based on a signal to noise ratio of the second navigation signal.

6. The GPS receiver of claim 4, wherein the abnormal state of the second navigation signal is determined based on a change according to time of a pseudo-range or a carrier phase which is a measured value acquired from a navigation signal.

7. The GPS receiver of claim 1, wherein the abnormal state corresponds to not receiving the previously received first navigation signal.

8. The GPS receiver of claim 1, wherein the pseudo-range estimating unit determines a satellite where a signal to noise ratio as the first satellite having the second navigation signal as an abnormal signal.

9. The GPS receiver of claim 2, wherein the pseudo-range estimating unit corrects the estimated second pseudo-range by using a pseudo-range estimated from a previously measured pseudo-range of the first satellite.

10. The GPS receiver of claim 9, wherein the pseudo-range estimated from the previously measured pseudo-range of the first satellite is estimated by using any one of a modeling technique using a polynomial function, a modeling technique using a neural network, and a Kalman filter.

11. A calculation method of a navigation solution, comprising:
receiving a plurality of navigation signals from a plurality of respective satellites, including a first navigational signal from a first satellite;
acquiring position information of each respective satellite from the received navigation signals and measuring respective pseudo-ranges, including a first pseudo-range;
determining an abnormal state of a second navigation signal, wherein the second navigation signal is transmitted a time after the first navigation signal was transmitted and, upon determining the abnormal state, calculating a current position of the first satellite based upon first satellite position information previously stored in a memory before the abnormal state was determined; and
estimating a second pseudo-range of the first satellite based upon the calculated current position of the first satellite and an estimated current location of a receiving unit,
wherein the abnormal state of the second navigation signal is determined based on a change according to time of a pseudo-range or a carrier phase which is a measured value acquired from a navigation signal.

12. The calculation method of a navigation solution of claim 11, wherein the current position of the first satellite is determined from ephemeris data.

13. The calculation method of a navigation solution of claim 12, wherein the estimated current location of the receiving unit is based upon velocity and acceleration information of the receiving unit.

14. The calculation method of a navigation solution of claim 11 wherein an abnormal state corresponds to an obstructed satellite.

15. The calculation method of a navigation solution of claim 11, wherein the abnormal state is determined based on a signal to noise ratio of the second navigation signal.

16. The calculation method of a navigation solution of claim 11, wherein the abnormal state corresponds to not receiving the previously received first navigation signal.

17. The calculation method of a navigation solution of claim 11, wherein the abnormal state corresponds to a decrease in a signal to noise ratio of the first navigation signal.

18. A GPS receiver, comprising:
a navigation signal receiving unit receiving a first navigation signal from a first satellite, and wherein a first communication path from the first satellite to the receiving unit is unobstructed;
a navigation signal processing unit acquiring position information of the first satellite and measuring a pseudo-range of the first satellite; and
a pseudo-range estimating unit determining an abnormal state of a second navigation signal from the first satellite to the receiving unit, wherein the second navigation signal is transmitted a time after the first navigation signal was transmitted and, upon determining the abnormal state, estimating a current location of the receiving unit and calculating a current position of the first satellite based upon first satellite position information previously stored in a memory before the abnormal state was determined, and estimating a second pseudo-range of the first satellite based upon the calculated current position of the first satellite and the estimated current location of the receiving unit, and wherein the abnormal state of the second navigation signal is determined based on a signal to noise ratio of the second navigation signal, wherein the abnormal state of the second navigation signal is determined based on a change according to time of a pseudo-range or a carrier phase which is a measured value acquired from a navigation signal.

* * * * *